June 17, 1969 C. H. GARDNER 3,450,953
CODE CARD COMPARING DEVICE
Filed June 17, 1965 Sheet 1 of 5

INVENTOR
CLAYTON H. GARDNER

June 17, 1969 C. H. GARDNER 3,450,953

CODE CARD COMPARING DEVICE

Filed June 17, 1965 Sheet 4 of 5

June 17, 1969 C. H. GARDNER 3,450,953

CODE CARD COMPARING DEVICE

Filed June 17, 1965 Sheet 5 of 5

United States Patent Office 3,450,953

Patented June 17, 1969

3,450,953
CODE CARD COMPARING DEVICE

Clayton H. Gardner, 37 Girard Ave., Chatham, N.J. 07928

Filed June 17, 1965, Ser. No. 464,645
Int. Cl. H01h 47/00, 43/08, 3/16
U.S. Cl. 317—134 21 Claims

ABSTRACT OF THE DISCLOSURE

A pressure sensitive code card containing fifty contact positions with only five positions providing conductive paths through the card is inserted in a code card comparing device having a bank of fifty upper electrical contacts arranged opposite fifty lower electrical contacts. If five dial selectors on the comparing device have been set to conform with the code in the card, an electrical path is established through the card to actuate a load This invention relates to code card actuation apparatus, and more particularly, to apparatus in which the code on a code card is compared with another code.

Code card actuation apparatus is presently being fairly widely used for a number of different purposes. Such apparatus typically includes some type of electrical relay which is actuated in response to the insertion of a card which contains an appropriate code. The code on the card may be described in any of a number of different ways; for example, by a predetermined array of holes, or an array of electrical contacts in the card. Cards of this type are used, for example, to actuate a gate, to open a door, or to identify the holder as being one of a class of persons to whom the code cards have been issued.

One disadvantage of these known code card systems is that if one of the code cards is lost or stolen, it may be used by unauthorized personnel. Accordingly, it is one object of this invention to provide code card actuation apparatus which can be operated only by an authorized holder of a code card.

This and other objects of my invention are attained in an illustrative embodiment thereof comprising a code card device having a bank of fifty upper electrical contacts which are arranged opposite a bank of fifty lower electrical contacts. Each authorized code card contains fifty visible contact positions which correspond to the positions of the upper and lower contacts of the code card comparing device. However, only five of the fifty contact positions on the code card provide conductive paths through the code card, and, since different cards have a different set of five conductors, it is these five conductors in the code card which describe the code contained in the card.

Only if the operator knows the code contained in the code card can he actuate the comparing device. The operator sets five dial selectors on the comparing device to conform with the code on the code card. Then he inserts the code card over the bank of lower contacts and lowers the bank of upper contacts against the upper side of the card. If the dial settings on the comparing device conform with the code in the code card, an electrical path is established through the card which actuates a load. The load may open a lock, identify the operator as being the true owner of the card, or serve various other useful purposes.

If one of the five dial settings does not correspond with the location of one of the conductors in the code card, the electrical path through the comparing device is not completed, and the load is not actuated. As will be explained more fully later, my invention includes several features for preventing the determination of the code on the code card by unauthorized personnel. In the preferred embodiment, for example, all fifty contact locations on the code card have identical appearances; the conductors for forming the conductive paths are preferably "buried" within the code card. Further, these conductors are preferably pressure sensitive so that they will establish conductive paths only if subjected to the mechanical pressure of my code card comparing device. As will also be explained later, the connections to the various upper and lower contacts of the comparing device are preferably random rather than sequential, so that even if an unauthorized person were to dissect the code card, he could not ascertain the code contained therein without similarly examining the electrical connections within the comparing device.

As will be explained more fully later, each of the selectors over a dial is connected to a pair of ganged selector switches, each having ten switch contacts and a movable connector. The switch contacts of one of the pair are each connected to one of the upper contacts, while each switch contact of the other switch is connected to corresponding lower contacts. Movement of the selector moves the two ganged connectors to make contact with corresponding switch contacts. A conductive path is completed between each two ganged selector switches only if a conductor in the code card interconnects the upper and lower contacts to which the selected switch contacts are connected. As mentioned before, all five of the code card conductors must interconnect proper upper and lower contacts for actuation of the load relay.

In accordance with another feature of my invention, all of the contacts of the five pairs of selector switches are conductively interconnected with the exception of those switch contacts which are contacted to the respective movable connectors of the switches. These unselected switch contacts in turn form part of another electrical circuit to which a disengagement relay is connected. If a conductor in the code card interconnects any corresponding upper and lower contacts which are connected to unselected switch contacts, current will flow therethrough to actuate the disengagement relay. The disengagement relay then prevents actuation of the load. The purpose of this feature is to prevent actuation of the load by a code card which contains more than the required five conductors, and is further insurance against fraudulent operation of the code comparing device.

For many purposes it may be desirable to effectively change the codes of the code cards by changing the dial settings which are required for actuation of the device by the code cards. For example, it may be desirable in a security system to restrict the hours during which certain classes of card holders would be permitted to operate the code card comparing device. In order to give this flexibility, my illustrative embodiment includes a drum interchanger for changing the connections between the switch contacts and the upper and lower contacts. For this embodiment, it is important that corresponding switch contacts of each pair of selector switches be connected respectively to corresponding upper and lower contacts. The corresponding upper and lower contacts to which corresponding switch contacts are connected is changed by merely rotating my drum interchanger to a different contact position as will be explained more fully later. Each discrete contact position of the drum interchanger changes the connections between switch contacts and some or all of the upper and lower contacts to change the dial code setting that is required to be used with some or all of the code cards.

These and other objects and features of my invention will be better appreciated from a consideration of the following detailed description, taken in conjunction with the accompanying drawing in which.

Figure 1:
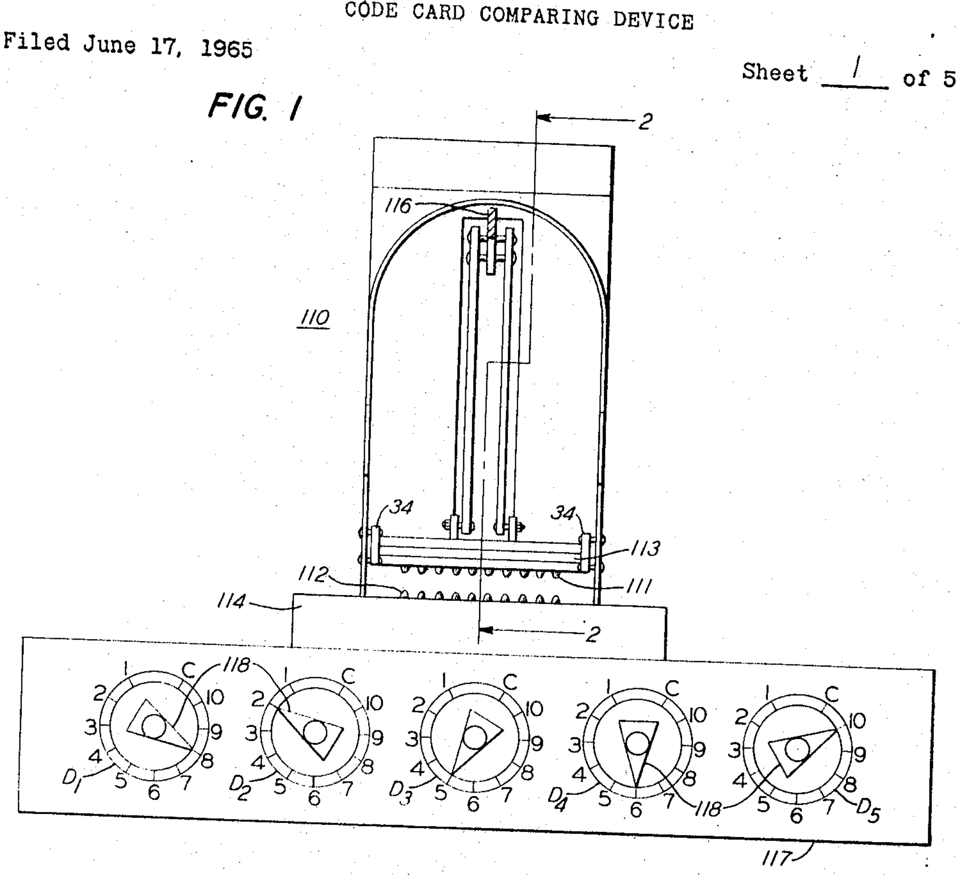
FIG. 1 is a front view of a code card comparing device in accordance with an illustrative embodiment of the invention.
Figure 2:
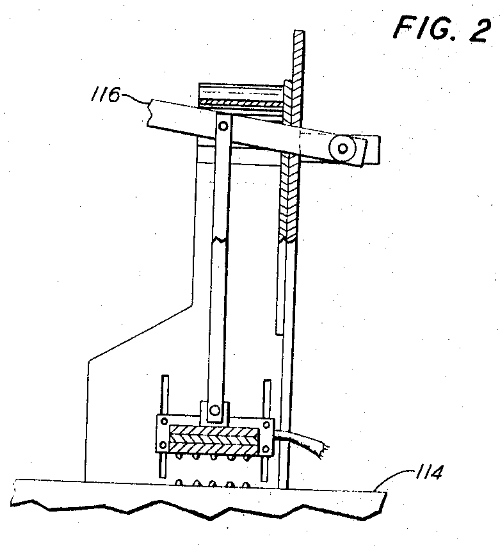
FIG. 2 is a view taken along lines 2—2 of FIG. 1.

Referring now to FIGS. 1 and 2, there is shown an illustrative code card comparing device 110 comprising a bank of upper contacts 111 and a bank of lower contacts 112. The bank of upper contacts 111 are mounted within a movable block 113 while the bank of lower contacts 112 are mounted within a stationary block 114. As is shown more clearly in FIG. 2 the upper block 113 may be forced downwardly by operating a lever 116.

Mounted on a base 117 of the code card comparing device are five dials D1 through D5, each of which includes a selector 118. The purpose of the device of FIG. 1 is to operate a load such as a relay when a code card is inserted that contains a code that conforms to the selector settings of the dials D1 through D5. A preferred code card 120 shown in FIG. 3 comprises fifty visible contacts numbered 1 through 50 which are arranged in five rows of ten contacts each. The card 120 is inserted between the upper block 113 and lower block 114 of the device of FIG. 1 such that each of the card contacts 1 through 50 is directly opposite one of the upper contacts 111. The card comparing device 110 contains fifty upper contacts 111 arranged in five rows of ten contacts each as can be appreciated from FIGS. 1 and 2. The fifty lower contacts 112 are similarly arranged. When the lever 116 is depressed to compress the code card 120 between the upper bank of contacts 111 and the lower bank of contacts 112, current will flow through the code card to actuate the load relay only if the dials D1 through D5 are set to describe an appropriate code which conforms to the code in the code card.

Figure 3:
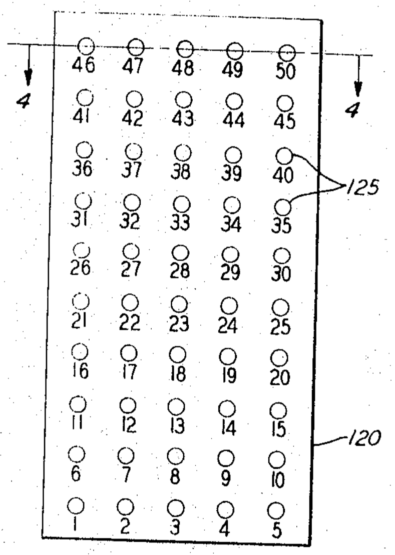
FIG. 3 is a view of the upper surface of a code card which is adapted for insertion into the device of FIG. 1.
Figure 4:
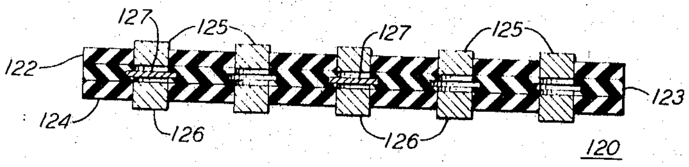
FIG. 4 is a view taken along the lines 4—4 of FIG. 3.

As is shown in FIG. 4, the code card 120 is formed from three laminated insulative layers 122, 123 and 124. The visible contacts shown in FIG. 3 are formed by conductors 125 which are contained within the upper layer of the card 122. Similar visible conductors 126 are located in the lower layer 124 of the code card. The code of the code card is described by the locations of conductors 127 which are peripherally imbedded within the middle layer 123 at discrete locations. Only if a middle conductor 127 is located between corresponding outer conductors 125 and 126, can a current path be completed through the code card 120. As is shown more clearly in FIG. 5. the middle conductor 127 is preferably separated from the corresponding outer conductors 125 and 126 by small gaps so that a current path is completed between the opposite conductors 125 and 126 only if they are compressed against the middle conductor 127. The layers 122, 123, and 124 are preferably made of an insulative plastic which is sufficiently flexible to permit contact between the conductors when pressure is applied thereto.

Figure 6:
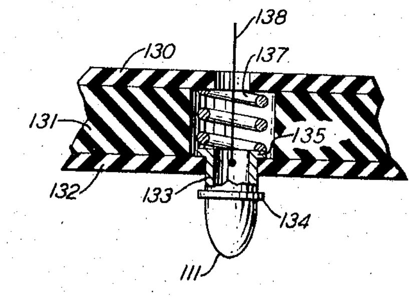
FIG. 6 is an enlarged sectional view of one of the contacts of FIGS. 1 and 2.

As is shown schematically in FIG. 6, the upper block 113 of the device of FIG. 1 preferably includes three layers 130, 131, and 132 which are made of an insulative material such as wood. Each of the contacts 111 is part of an eyelet 133 having displaced flanges 134 and 135. Contained within a cylindrical chamber in the middle layer 131 is a coiled spring 137 which bears against the eyelet 133 to force the flange 135 against the edges of an opening in the layer 132. A conductor 138 extends through an opening in layer 130 as shown schematically to make electrical contact with the upper contact 111. It can be seen that when the upper block is depressed, the eyelet 133 can be forced against the spring bias up into the chamber of the middle layer 131.

The purpose of this construction of the upper contacts 111 is to apply well-distributed pressure on the code card when the upper block 113 is forced against the code card. The resulting pressure on the code card between opposite upper contacts 111 and lower contacts 112 forces all of the middle conductors 127 in the code card to make electrical contact with the correpsonding outer conductors 125 and 126 so that an electrical path may be completed therethrough. This provides an electrical path through certain corresponding upper contacts 111 and lower contacts 112 as described before.

In this illustrative embodiment of the invention, each card 120 which is to be used with the device of FIG. 1 contains a five digit code; that is, five and only five of the contacts 1 through 50 of FIG. 3 provide electrical paths through the card. If the resulting electrical interconnections between five upper contacts 111 and five lower contacts 112 correspond with the five dial settings of dials D1 through D5, then the code card comparing device 110 will actuate the load. It is clear from this that the holder of a particular code card 120 must know the code contained in it in order to enable him to make the proper dial settings that are needed to actuate the load.

Figure 7:
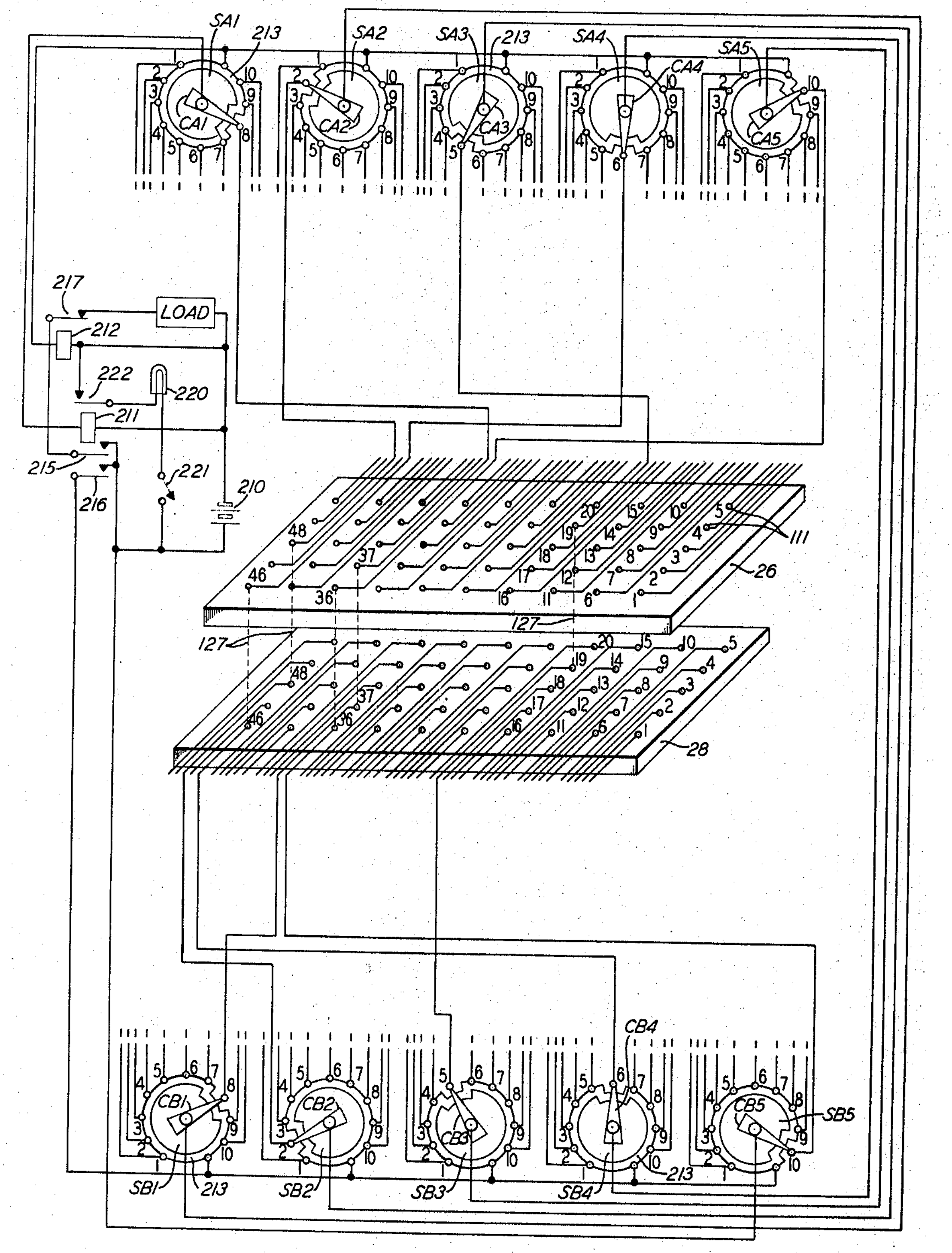
FIG. 7 is a schematic diagram of the code card comparing device of FIG. 1.

The electrical circuit by which the code card comparing device 110 performs its desired function is shown schematically in FIG. 7. FIG. 7 schamatically shows the bank of upper contacts 111 and the bank of lower contacts 112 in perspective. Each of the two banks of contacts are numbered 1 through 50 which corresponds to the numbering of the corresponding contacts on the code card of FIG. 3. As explained before, if the code card provides a conductive path at a particular location, it will electrically interconnect corresponding upper and lower contacts at that same location. For example, if the contact 19 of the code card of FIG. 3 provides a conductive path therethrough, it will conductively interconnect the corresponding upper and lower contacts 19 of FIG. 7 as is indicated by the dotted line. Of course, a bona fide code card, in accordance with this illustrative embodiment, will only interconnect five corresponding pairs of upper and lower contacts 111 and 112.

The circuit of FIG. 7 includes a voltage source 210 which is connected to an engagement relay 211 and a disengagement relay 212. The engagement relay 211 is connected to a movable connector CA1 of a selector switch SA1. The movable connector CA1 is mechanically ganged with a movable connector CB1 of a selector switch SB1. The movable connectors CA1 and CB1 are in turn ganged to and movable with the selector 118 of dial D1 of FIG. 1. If so desired, the selector 118 of dial D1 and the movable connectors CA1 and CB1 may be mounted on a common rotatable shaft. Other movable connectors CA2–CA5 are likewise ganged with movable connectors CB2–CB5 to move in response to the dial settings of dials D2 through D5. That is, movable connectors CA2 and CB2 are ganged to rotate with the selector of dial D2; the movable connectors CA3 and CB3 are ganged to rotate with the rotation of the selector of dial D2, and so forth.

The selector switches SA1 through SA5 and SB1 through SB5 are in the form of wafers each having circumferentially arranged contacts 1 through 10 which correspond to the positions 1 through 10 on each of the five dials D1 through D5 of FIG. 1. For example, when the selector of the dial D1 is at position 8, the movable connector CA1 is in contact with contact 8 of selector switch SA1 and the movable connector CB1 contacts the contact 8 of selector switch SB1. In the example shown, the dials D1 through D5 of FIG. 1 are set to define the code 82560 which serves to set the switches SA1 through SA5 and SB1 through SB5 to make contact with the selector switch contacts 8, 2, 5, 6, and 0, respectively. Various appropriate mechanical connections between the pairs of movable connectors CA1, CB1 through CA5, CB5, so that the two connectors of each pair make contact with like-numbered switch contacts, are matters of conventional design within the ordinary skill of a worker in the art.

The wafer selector switches SA1–SA5 and SB1–SB5, are each of a known type which includes a circumferential conductor 213 which short circuits all of the unselected contacts of the wafer switch. For example, in the selector switch SA1 the circumferential conductor 213 electrically interconnects all of the switch contacts except the selected contact number 8. This is because the circumferential conductor 213 includes an indented portion which rotates with the movable conductor CA1 to avoid contact with the selected selector switch contact. The conductor 213 is insulated from the corresponding movable conductor. Alternative designs of the selector switches could, of course, be used if so desired to accomplish the same results. All of the circumferential conductors 213 of the selector switches SA1 through SA5 are connected to the disengagement relay 212, while all of the cumferential conductors 213 of switches SB1 through SB5 are connected to the voltage source 210 when a contact 216 is closed. Typically, contact 216 is closed when the lever 116 of FIG. 1 is depressed.

Each of the switch contacts of switches SA1 through SA5 are connected to one of the bank of upper contacts 111, while each of the switch contacts of switches SB1 through SB5 are connected to one of the bank of lower contacts 112. The corresponding switch contacts of each pair of selector switches are connected to corresponding upper and lower contacts 111 and 112. For example, the switch contact No. 8 of SA1 is connected to the upper contact No. 37, while the corresponding contact No. 8 of switch SB1 is connected to the lower contact No. 37. Only the interconnections of the selected switch contacts with the upper and lower banks of contacts are shown on the drawing; the other interconnections are not shown for purposes of clarity. Note, however, that for this embodiment the interconnections of switch SA2 with the upper bank of contacts 111 corresponds with the interconnections of SB2 with the lower bank 112. Likewise the interconnections of SA3 correspond with those of SB3, SA4 correspond with those of SB4, and SA5 correspond with those of SB5.

Aside from the corresponding interconnections of each pair of selector switches, the interconnections of the switches with the banks of contacts are preferably random. In the example shown, the connection of contact 8 of switch SA1 with upper contact No. 37 is arbitrary; it could have been connected to any of the other 50 upper contacts. In that case, however, the contact 8 of the corresponding switch SB1 would have to be connected with a corresponding one of the lower bank of contacts 112.

Referring again to FIG. 4, it is to be recalled that only five of the contacts 125 provide conductive paths through the card. In the example shown, assume that only the conductors at positions 46, 48, 36, 37, and 19 provide conductive paths through the card; that is, only at these positions are middle conductors 127 located within the middle layer of the card to provide a conductive path therethrough. With the card inserted between the upper and lower banks of contacts, current paths will be provided through the card at these specific locations. These current paths are shown by dotted lines on FIG. 7 that are labeled 127 to indicate that these paths are provided by the middle conductors 127 in the code card.

In the example shown, the dials of FIG. 1 have been properly set to conform with the code on the code card which provides the conductive paths 127 of FIG. 7. With the selector switches SA1–SA5 and SB1–SB5 thus properly set, current will flow through relay 211 to close the normally open contact 215 and thereby provide an electrical circuit through which current flows through the load. Current flows from the winding of relay 211 through the movable conductor CA1 to the upper contact 111 at location 37, hence through the code card interconnection 127 to the lower contact position 37, then to the movable conductor CB1, and from there to the movable conductor CA2 of switch SA2. Tracing the circuit further shows that current flows through all of the selector switches SA1–SA5 and SB1–SB5, and through all of the five code card interconnections 127, and thence to the D-C source.

It can be appreciated that if any one of the code card interconnections 127 are misplaced with respect to a corresponding selector switch location, current will not flow through the engagement relay 211, and the contacts 215 for engaging the load will not be actuated. Hence, all five of the dial settings must conform with all five of the conductive locations on the code card. The actuated load may be a relay that is used, for example, to open a door, or to identify the person which has operated it as an authorized card holder.

It can further be appreciated that the operator must be aware of the code in his card in order to be able to operate the code comparing device. In the example shown, the operator must be aware that his card contains the code 82560, and it is this code that must be set by dials D1–D5 for the code comparing device to be operated by the code card of FIG. 4.

From the foregoing it should be clear that there is no logical relationship between the locations of the five conductive paths through the code card of FIG. 4 and the appropriate dial settings that are required in conjunction with the code card. Therefore, even if unauthorized personnel could determine the locations of the middle conductors 127 of the code card, they would not thereby know the required dial settings without a detailed examination of the connections to the upper and lower contact banks 111 and 112 of FIG. 7. However, it should also be clear that in the absence of additional circuitry, a fraudulent code card in which all 50 of the contact positions provided conductive paths would actuate the load relay because the five required conductive paths would be provided. Possible fraudulent operation of this type is prevented by the inclusion of the disengagement relay 212.

Note again that the winding of the relay 212 is connected by way of conductors 213 to all of the unselected contacts of selector switches SA1–SA5. If any of these unselected switch contacts is interconnected with a corresponding unselected switch contact of the switches SB1–SB5, current will flow through the relay 212, through the code card, through one of the switches SB1–SB5, through contact 216, and back to the voltage source 210. The operation of relay 212 will open the normally closed contacts 217, and thereby break the circuit to the load.

In accordance with another feature, a warning device 220 is included for giving an indication of an attempted operation of the comparing device by unauthorized personnel, or by a person who has made the wrong dial settings. The warning circuit includes a switch 221 which closes when the lever 116 of FIG. 1 is depressed, and a normally closed contact 222 which is responsive to the engagement relay 211. If the engagement relay 211 is operated properly, the normally closed contacts 222 will open and no current will flow to the warning device 220. However, if an unsuccessful attempt is made to operate the comparing device, the normally closed contacts 222 will remain closed, the switch 221 will be closed when the lever 116 is depressed, and warning device 220 will be actuated. The warning device 220 may be a light, a buzzer, or any other desired indicating device. Additional circuitry may be included for operating the warning device 220 upon actuation of the disengagement relay 212.

Of course, the warning circuit is not essential to the invention and in many cases may be eliminated.

For some purposes, it may be desirable to change periodically the wiring of the code card comparing device in order to restrict the accessibility of certain card holding personnel. For example, in certain security operations, it may be desirable to permit certain card holders to operate the code card comparing device only during certain hours of the day.

Figure 8:
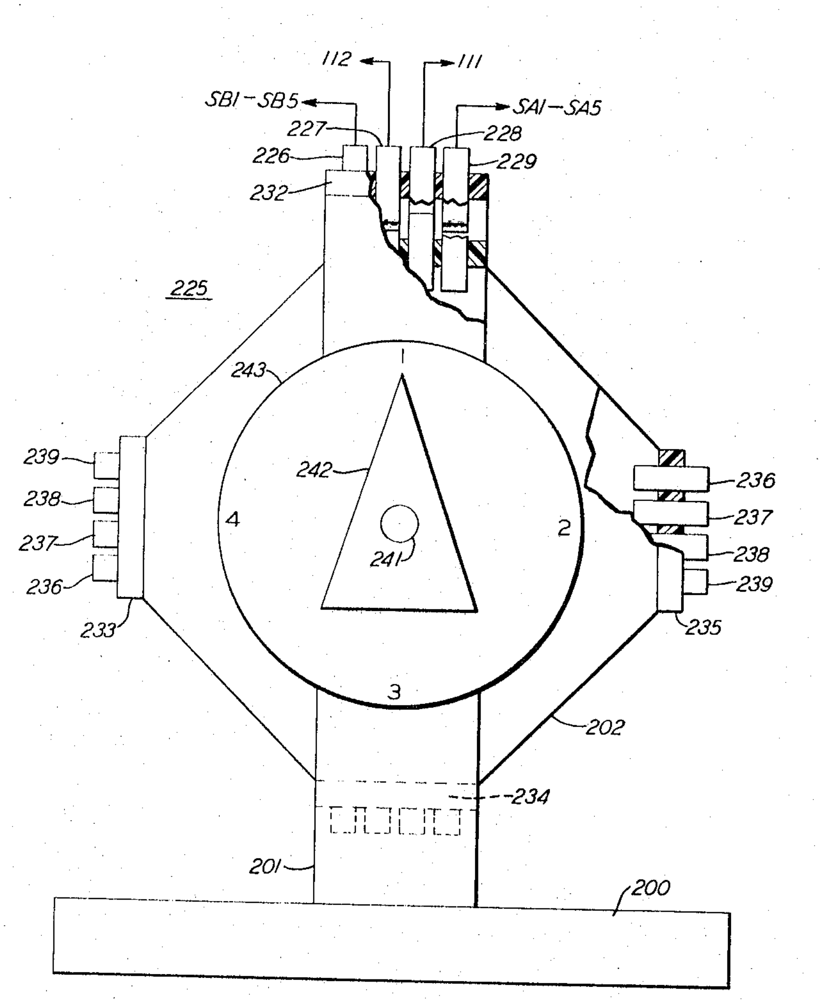
FIG. 8 is a front view of a drum interchanger which may be used in the device of FIG. 1.
Figure 9:
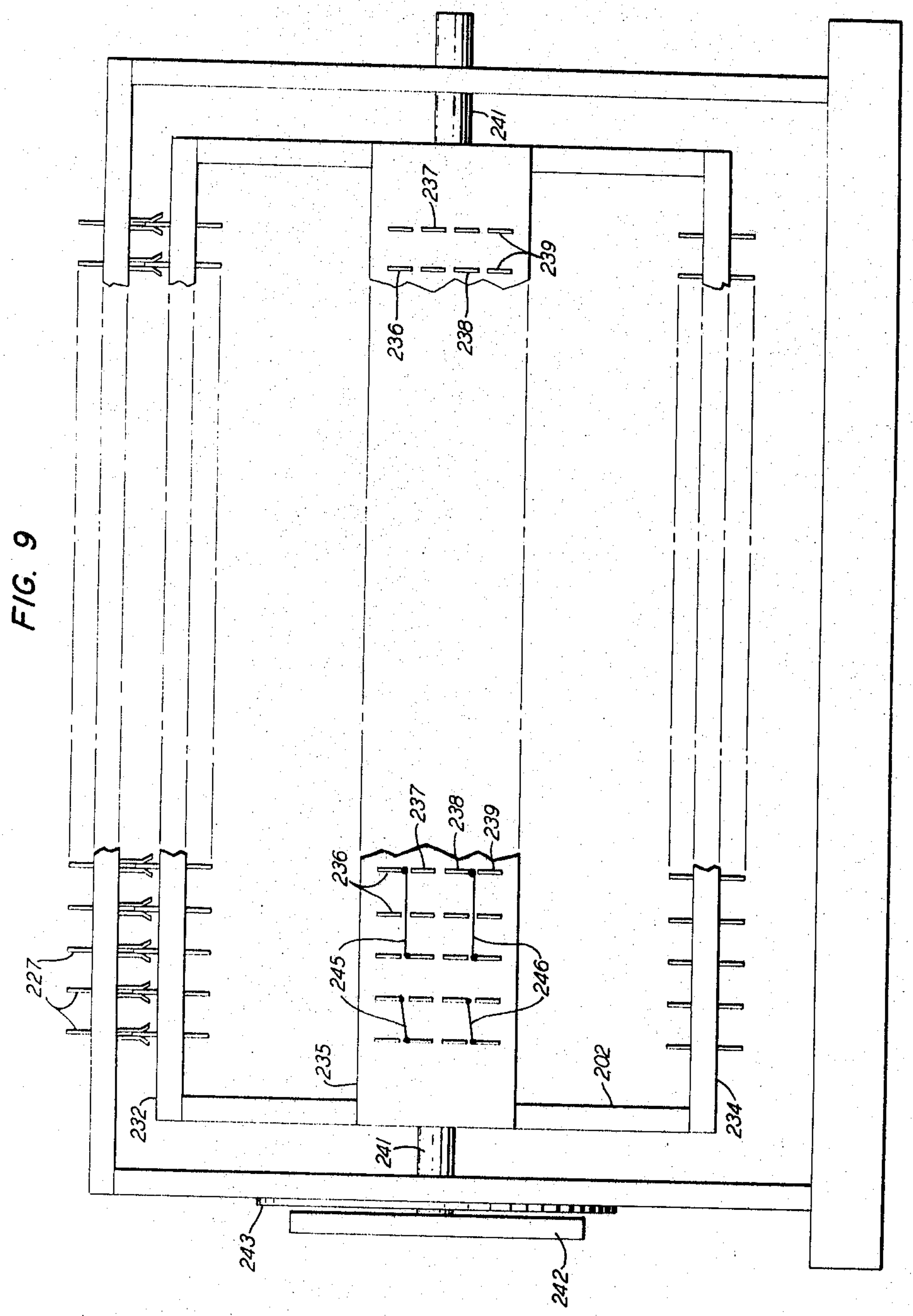
FIG. 9 is a side view of the drum interchanger of FIG. 8.

Referring now to FIGS. 8 and 9, there is shown a drum interchanger 225 for accomplishing these ends. The interchanger includes four rows of stationary contacts 226, 227, 228, and 229, each row containing fifty contacts. As indicated diagrammatically on FIG. 8, each of the fifty stationary contacts 227 is connected to one of the lower contacts 112 of FIGS. 7 and 1. Each of the fifty stationary contacts 228 is connected to a different one of the upper contacts 111. Each of the stationary contacts 226 is connected to one of the switch contacts of switches SB1–SB5, while each of the fifty contacts 229 is connected to one of the switch contacts of switches SA1–SA5. The drum interchanger includes a rotatable drum 202 which contains four sets of movable contacts 232, 233, 234, and 235. Each of the contact sets 232–235 contains four rows of fifty movable contacts 236, 237, 238, and 239. The drum is rotatable on an axle 241 by a selector 242. Four discrete angular selector positions are indicated on a dial 243.

Referring to FIG. 9, all of the contacts 237 are interconnected with different contacts 236 of the same contact set. Likewise, movable contacts 238 and 239 are interconnected in a manner which corresponds to the interconnection of contacts 236 and 237. For purposes of clarity, only two interconnections of contacts 236 and 237 are shown by conductors 245. Corresponding interconnections of contacts 238 and 239 are shown by conductors 246. Note that the first of the contacts 237 and 239 are both connected to the second of the contacts 236 and 238; the third contacts of rows 237 and 239 are connected to the fifth contacts of rows 236 and 238. In like manner, the remaining contacts 239 and 237 are connected with corresponding contacts 238 and 236 of the same contact set.

In FIG. 8 the contact set 232 is shown as being in position to make contact with the stationary contacts 226–229. It can be seen that this contact set 232 interconnects the contacts of selector switches SA1–SA5 with the upper contacts 111, and it gives a corresponding interconnection of the contacts of switches SB1–SB5 with the lower contacts 112. As was mentioned before, these corresponding interconnections are required for proper operation of the device shown schematically in FIG. 7. Each of the other movable contact sets 233–235, however, contain different corresponding interconnections so that when the selector 242 is moved counterclockwise to position 4, the movable contact set 235 will come into contact with the stationary contacts 226–229 and thereby change the interconnections of the switches SA1–SA5 and SB1–SB5 with the corresponding upper and lower contacts 111 and 112. With each of the movable contact sets 232–235 interconnected in a different manner, it can be appreciated that different dial settings of dials D1–D5 of FIG. 1 will be required for giving actuation by a given code card. In the example described above, the code card may actuate the card comparing device and the load with a dial setting of 82560 only when the selector 242 is in position 1. When the selector is moved to position 4, a different dial setting code will have to be used to operate the device, depending upon the interconnections within the contact set 235. Of course, the interconnections between contacts 236 and 237 and between contacts 238 and 239 of each of the contact sets 233–235 may be made in such a way that only some of the cards coded for contact set 232 will not operate the device when contact sets 233, 234, or 235 are rotated to contact the stationary contact.

The four sets of movable contacts 232–235 were shown only for purposes of illustration. Any number of contact sets could be used as desired. It may be desired to operate the selector 242 by a time clock so that changes of the code can be made at selected hours of the day. It can be shown that there are fifty factorial different ways of interconnecting the contacts of switches SA1–SA5 and SB1–SB5 with the upper and lower contacts 111 and 112 so that a number of drum interchanges 225 could be used for selectively changing the code required with various outstanding code cards. This would be useful for rescinding the right of a particular card holding person to operate the device.

Figure 5:
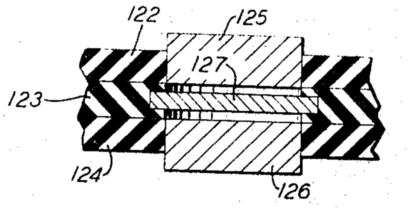
FIG. 5 is a view taken along lines 5—5 of FIG. 4.

In summary, it can be seen that I have provided apparatus which can be operated by the holder of a code card only if he knows the code contained in his card with respect to the code card comparing device. The code which must be known by him to operate the device with his code card can be conveniently changed by the use of a drum interchanger. Of course, more straightforward methods of changing the wiring of the code card comparing device could also be used if so desired. The code card which I have shown in FIGS. 4 and 5 is preferred because it is a relatively simple construction and because it provides additional insurance against use by unauthorized personnel. The code card could be simplified by merely including five holes in the card for permitting contact by selected upper and lower contacts of the code card comparing device and thereby describing the code. Alternatively, magnetic material could be imbedded within the card in a known manner for describing the code or a surface embossing in a known manner could describe the code. For each of these latter methods of coding a card, instead of conductive paths through the card, there would be small switches activated either by the magnetic material or the embossing on the card.

The terms "upper" and "lower" contacts have been used only for purposes of convenience and clarity; they are intended only to describe the oppositely disposed contacts of this embodiment and are not limited to any particular orientation with respect to ground or other reference plane.

The oppositely disposed contacts of this embodiment are not crucial for this invention. The conductive paths in the code card, if used, can be from a point on one side of the code card to a point on the same side or to a point in the edge; the switches activated by magnetic material or by embossings on the card clearly do not require oppositely disposed contacts.

While my code card system has a large number of potential uses, it is especially useful with a credit card system. It can be shown that 100,000 different five-digit codes can be included in code cards of the type shown in FIG. 4. By using a device such as the drum interchanger of FIG. 8, the number of outstanding different code cards can be vastly multiplied. Of course, if the credit card were lost it would be virtually useless to an unauthorized holder.

Various other modifications and embodiments may be made by those skilled in the art without departing from the spirit and scope of the invention.

What is claimed is:

1. Code card comparing apparatus comprising:

a plurality of first contacts and a plurality of corresponding second contacts;

switching means for selectively contacting only certain first contacts and the corresponding second contacts;

means comprising a code card for selectively interconnecting only certain first contacts and certain second contacts;

a load;

and means for actuating the load only when said selective interconnecting of the code card corresponds to said selective contacting.

2. The apparatus of claim 1 further comprising:

means for detecting certain unauthorized alterations of the code card;

said last-mentioned means comprising means for contacting all of the unselected first contacts and the corresponding second contacts;

means for actuating a disengagement relay when one or more interconnections of the code card correspond to the contacting of an unselected first contact and the corresponding second contact.

3. Code card comparing apparatus comprising:

a plurality of pairs of ganged switches;

each pair comprising a plurality of first switch contacts, a plurality of second switch contacts that correspond to the first switch contacts, a first movable connector for selectively contacting any of the first contacts, and a second movable connector ganged to the first movable connector for selectively contacting second contacts;

a plurality of corresponding third and fourth contacts;

corresponding third and fourth contacts being respectively interconnected with corresponding first and second contacts;

means comprising a code card for interconnecting only certain corresponding third and fourth contacts;

means for electrically energizing at least one of the movable connectors;

and load means responsive to current flow through corresponding first and second contacts.

4. The apparatus of claim 3 wherein:

the pairs of ganged switches are arranged in a series;

the second movable connector of each pair is interconnected with the successive first movable connector with the exception of the last second movable connector of the series;

and the first movable connector that is first in the series and the last second movable connector of the series are connected to an electrical circuit that includes the load.

5. The apparatus of claim 3 further comprising:

a disengagement circuit comprising means for interconnecting all of the first switch contacts which are not in contact with any of the first movable connectors, and means for interconnecting all of the second switch contacts which are not in contact with any of the second movable connectors;

and means responsive to current flow through any of the first and second switch contacts that are not in contact with any of the movable connectors for disengaging the load means.

6. A method for actuating a relay comprising steps of:

providing a code card which contains interconnecting means at a predetermined number of selected locations, the interconnecting means describing a predetermined code;

selectively making by switching means, in accordance with the predetermined code, electrical connections to a predetermined number of a bank of first contacts and a predetermined number of a bank of second contacts such that the locations of the first and second contacts to which connection is made correspond with the locations of the code card interconnecting means;

inserting the code card in proximity to the first and second banks of contacts;

bringing the first and second banks of contacts into physical and electrical contact with the code card, thereby interconnecting the predetermined number of first and second contacts by way of the interconnecting means of the code card.

7. In combination:

a code card comparing device including means for individually selecting a predetermined number of digits;

a bank of upper contacts;

a bank of lower contacts;

switching means responsive to the selection of each of the digits for making electrical connection with corresponding contacts of the upper and lower banks;

means comprising a code card adapted for insertion between the upper and lower banks for selectively interconnecting certain upper and lower contacts;

and means responsive to the interconnection by the code card of the corresponding upper and lower contacts to which the switch means has made electrical connection for actuating a load device.

8. The combination of claim 7 further comprising:

means for compressing the code card between the bank of upper contacts and the bank of lower contacts;

each of the upper contacts being mounted in an upper mounting block and comprising a cylindrical eyelet having upper and lower flanges;

and spring means for biasing the upper flange of each eyelet against a peripheral shoulder in the mounting block;

these compression exerting forces on the contacts opposite in direction to the spring bias forces, whereby the compression forces on the code card are substantially equally distributed.

9. The combination of claim 8 wherein the code card includes pressure sensitive contacts at locations corresponding to the locations of the selected interconnections of said certain upper and lower contacts.

10. The combination of claim 9 wherein:

the code card includes an array of upper conductors on an upper planar surface thereof and an array of lower conductors on a lower planar surface thereof, which have locations corresponding to the locations of the banks of upper and lower contacts;

and the pressure sensitive contacts each comprise a middle conductor imbedded within the code card directly between an upper conductor and a lower conductor and separated therefrom by a small air gap.

11. Code card actuating apparatus comprising:

an array of upper contacts displaced from a corresponding array of lower contacts;

a first electrical circuit including load means responsive to current flow through the first circuit;

switching means for interconnecting part of the first electrical circuit with only selected upper contacts and for simultaneously interconnecting another part of the first electrical circuit with only selected lower contacts, whereby the displacement of the two arrays normally constitutes an open circuit condition in the first electrical circuit;

the selected upper and lower contacts having predetermined physical locations in their respective arrays;

means comprising a code card which is insertable between the two arrays for interconnecting only certain upper and lower contacts in accordance with their predetermined locations;

and current source means responsive to the interconnections of all of said selected upper contacts with all of said selected lower contacts for energizing the first circuit and for actuating the load means.

12. The code card actuating apparatus of claim 11 further comprising:

a second electrical circiut including a disengagement relay for disengaging the load device from the first circuit;

part of said circiut being connected in parallel to all of the unselected upper contacts and another part of the second circuit being connected in parallel to all of the unselected lower contacts, whereby the displacement of the two arrays normally constitutes an open circuit in the second electrical circuit;

and means responsive to the interconnection by the code card of any of the unselected upper and lower contacts for actuating the disengagement relay.

13. The code card actuating apparatus of claim 11 wherein:

the switching means comprises a plurality of pairs of selector switches;
- each pair comprising a plurality of first switch contacts, a plurality of second switch contacts that correspond to the first switch contacts, a first movable connector for selectively contacting any of the first contacts, and a second movable connector ganged to the first movable connector for selectively contacting second contacts;
- each of the first switch contacts being interconnected with one of the upper contacts;
- each of the second switch contacts being interconnected with one of the lower contacts;
- corresponding first and second switch contacts being connected to upper and lower contacts having corresponding locations in their respective arrays.

14. The code card actuating apparatus of claim 13 further comprising a drum interchanger for selectively simultaneously changing the interconnections of the first switch contacts with the upper contacts and the second switch contacts with the lower contacts, thereby selectively changing the position of the movable connectors required for actuation of the load in response to the insertion of a specific code card.

15. The code card actuating apparatus of claim 14 wherein:
- the drum interchanger includes arrays of first, second, third, and fourth stationary terminals;
- each of the first switch contacts is connected to a first stationary terminal;
- each of the second switch contacts is connected to a second stationary terminal;
- each of the upper contacts is connected to a third stationary terminal;
- each of the lower contacts is connected to a fourth stationary terminal;
- the drum interchanger further comprises a plurality of contact sets mounted on a rotatable element;
- each contact set comprises arrays of first, second, third, and fourth movable contacts;
- the arrays of first, second, third, and fourth movable contacts of each contact set are adapted to make electrical connection, respectively, with the arrays of first, second, third, and fourth stationary terminals;
- the first and third movable contacts of each contact set are interconnected;
- the second and fourth movable contacts of each contact set are interconnected;
- and the rotatable element constitutes means for selectively interconnecting the stationary terminals with any one of the contact sets, thereby selectively changing the interconnections of the first switch contacts with the upper contacts and the second switch contacts with the lower contacts.

16. The actuating apparatus of claim 11 further comprising:
- a plurality of suitable code cards;
- each of said code cards being adapted to interconnect a different combination of upper and lower contacts, whereby the load can be actuated if, and only if, the switching means has interconnected the electrical circuit with upper and lower contacts which correspond to a code card that has been inserted.

17. In combination:
- a code card comparing device including a plurality of dials;
- each of said dials comprising a selector mounted on a shaft which is rotatable to any of a number of discrete digital locations;
- a bank of upper contacts;
- a bank of lower contacts;
- first and second movable connectors linked with each shaft and rotatable therewith;
- each first and second rotatable connector constituting means for making electrical connection with corresponding contacts of the upper and lower banks;
- a code card adapted for insertion between the upper and lower banks;
- means for compressing the code card between the upper and lower banks;
- said code card including means which is responsive to compression for selectively interconnecting certain upper and lower contacts;
- and means responsive to the interconnection by the code card of corresponding upper and lower contacts to which each of the first and second movable connectors have electrical connection for actuating a load device.

18. In apparatus of the type comprising a bank of first contacts interconnected with a bank of second contacts and a bank of third contacts interconnected with a bank of fourth contacts, wherein corresponding first and third contacts are interconnected with corresponding second and fourth contacts, a drum interchanger for selectively changing said interconnections comprising:
- arrays of first, second, third, and fourth stationary terminals;
- each of said first contacts being connected to a first stationary terminal;
- each of the second contacts being connected to a second stationary terminal;
- each of the third contacts being connected to a third stationary terminal;
- each of the fourth contacts being connected to a fourth stationary terminal;
- a plurality of contact sets mounted on a rotatable element;
- each contact set comprising arrays of first, second, third, and fourth movable contacts;
- the arrays of first, second, third, and fourth movable contacts of each contact set being adapted to make electrical connection, respectively, with the arrays of first, second, third, and fourth stationary terminals;
- the first and second movable contacts of each contact set being interconnected;
- third and fourth movable contacts of each contact set being interconnected;
- the interconnections of the first and second movable contacts of each contact set corresponding with the interconnections of the third and fourth movable contacts of that same contact set;
- and the rotatable element constitutes means for selectively interconnecting the stationary terminals with any one of the contact sets, thereby selectively changing the interconnections of the bank of first contacts with the bank of second contacts and the bank of third contacts with the bank of fourth contacts.

19. Code cards comparing apparatus comprising:
- a plurality of first contacts and a plurality of corresponding second contacts;
- switching means for selectively contacting only certain first contacts;
- means comprising a code card for selectively interconnecting only certain first contacts and certain second contacts;
- means for contacting at least the second contacts interconnected to the first contacts by the code card;
- a load; and
- means for actuating the load only when said selective interconnecting of the code card corresponds to said selective contacting.

20. A method for actuating a relay comprising the steps of:
- providing a code card that contains interconnecting means at a predetermined number of selected locations, the interconnecting means describing a predetermined code;
- selectively making by switching means, in accordance with the predetermined code, electrical connections to a predetermined number of a bank of first contacts such that the locations of the first contacts to which connection is made correspond with the locations of the code card interconnecting means;

making electrical connections to at least those second contacts whose locations correspond with the locations of the code card interconnecting means;

inserting the code card in proximity to the first and second banks of contacts;

and bringing the first and second banks of contacts into physical and electrical contact with the code card, thereby interconnecting the predetermined number of first contacts with the second contacts by way of the interconnecting means of the code card.

21. In combination:

a first member containing an array of contacts;

each contact comprising a cylindrical portion having thereon upper and lower flanges;

the cylindrical portion extending through an opening in the first member;

the opening having a smaller diameter than the diameters of the flanges;

the lower flange being located below the first member and the upper flange being located within a cylindrical chamber in the first member;

said cylindrical chamber having a diameter slightly greater than the diameter of the upper flange;

a conductor connected to the contact and extending through the first member;

means comprising a spring located within the chamber for biasing the upper flange against the member;

means for compressing the array of contacts against a second member;

the springs constituting means for distributing the forces of the array of contacts against the second member;

the second member comprising an array of upper conductors on an upper planar surface thereof and an array of lower conductors on a lower planar surface thereof, the conductors in each array having locations corresponding to the locations of the contacts in the contact array, whereby each contact is adapted to be compressed against one of the upper conductors;

a middle conductor embedded within the second member between certain upper and lower conductors and separated therefrom by small air gaps;

the major portion of the second member being made of flexible insulative material, whereby the compressive force of the array of contacts on the upper conductors causes the middle conductors to make electrical contact with said certain upper and lower conductors.

References Cited

UNITED STATES PATENTS

| | | | |
|---|---|---|---|
| 2,473,664 | 6/1949 | Taylor | 317—134 |
| 2,583,752 | 1/1952 | Smith | 317—134 X |
| 3,100,389 | 8/1963 | Noregaard | 70—278 |
| 3,139,519 | 6/1964 | Reinschmidt | 200—46 X |
| 3,182,144 | 5/1965 | Shoe | 200—46 |
| 3,247,425 | 4/1966 | Erikson | 317—134 |
| 3,308,253 | 3/1967 | Krakinowski | 200—46 |

FOREIGN PATENTS

| | | |
|---|---|---|
| 535,440 | 11/1955 | Italy. |

LEE T. HIX, *Primary Examiner.*

U.S. Cl. X.R.

200—46, 61.62; 317—135; 340—149